(12) United States Patent
Umeki et al.

(10) Patent No.: US 11,385,521 B2
(45) Date of Patent: Jul. 12, 2022

(54) WAVELENGTH CONVERSION APPARATUS

(71) Applicant: Nippon Telegraph and Telephone Corporation, Tokyo (JP)

(72) Inventors: Takeshi Umeki, Musashino (JP); Takushi Kazama, Musashino (JP); Koji Embutsu, Musashino (JP); Takahiro Kashiwazaki, Musashino (JP); Osamu Tadanaga, Musashino (JP); Ryoichi Kasahara, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/290,557

(22) PCT Filed: Oct. 29, 2019

(86) PCT No.: PCT/JP2019/042304
§ 371 (c)(1),
(2) Date: Apr. 30, 2021

(87) PCT Pub. No.: WO2020/095754
PCT Pub. Date: May 14, 2020

(65) Prior Publication Data
US 2021/0405502 A1   Dec. 30, 2021

(30) Foreign Application Priority Data
Nov. 6, 2018   (JP) .............................. JP2018-209123

(51) Int. Cl.
*G02F 1/35* (2006.01)
*G02F 1/39* (2006.01)
*G02F 1/355* (2006.01)

(52) U.S. Cl.
CPC .......... *G02F 1/3532* (2013.01); *G02F 1/3558* (2013.01); *G02F 1/392* (2021.01)

(58) Field of Classification Search
None
See application file for complete search history.

(56) References Cited

U.S. PATENT DOCUMENTS 5,671,232 A * 9/1997 Lee ..................... H01S 3/109
372/27
7,796,324 B2 * 9/2010 Furuya ................ G03B 21/204
359/328

(Continued)

FOREIGN PATENT DOCUMENTS

CN          101622575 A       1/2010

OTHER PUBLICATIONS

Takeshi Umeki et al., *Highly Efficient Wavelength Converter Using Direct-Bonded PPZnLn Ridge Waveguide*, IEEE Journal of Quantum Electronics. vol. 46, No. 8, Aug. 2010, pp. 1206-1213.

*Primary Examiner* — Rhonda S Peace
(74) *Attorney, Agent, or Firm* — Workman Nydegger

(57) ABSTRACT

A wavelength conversion apparatus using a nonlinear optical medium having a periodically poled structure is operated at an optimal temperature in a stable manner. The wavelength conversion apparatus includes a wavelength converter using a nonlinear optical medium and a controller for controlling temperature of the wavelength converter. The wavelength conversion apparatus further includes a first optical branch coupler for branching part of output light from the wavelength converter, and first and second wavelength separation filters for separating and outputting, from part of the output light, each of two light components generated by parametric fluorescence in the wavelength converter. The controller controls the temperature of the wavelength converter on the (Continued)

basis of difference in light intensity of the two light components.

10 Claims, 6 Drawing Sheets

(56) References Cited

U.S. PATENT DOCUMENTS

| | | | | |
|---|---|---|---|---|
| 8,411,714 B2* | 4/2013 | Furuya | ............... | H01S 3/0675 |
| | | | | 372/21 |
| 2010/0110533 A1 | 5/2010 | Kusukame et al. | | |
| 2021/0286228 A1* | 9/2021 | Kato | ............... | G02F 1/0147 |
| 2021/0405502 A1* | 12/2021 | Umeki | ............... | G02F 1/3558 |

* cited by examiner

WAVELENGTH CONVERSION APPARATUS

TECHNICAL FIELD

The present invention relates to a wavelength conversion apparatus, and more particularly relates to a wavelength conversion apparatus that includes an optical element using the nonlinear optical effect, and is used in optical communication systems, optical measurement systems, and so forth.

BACKGROUND ART

Many nonlinear optical devices and electrooptical devices are being developed, for generating and modulating coherent light throughout the ultraviolet region—visible region—infrared region—terahertz region, which can be applied to fields of wavelength conversion of optical signals in optical communication, light modulation, optical measurement, and optical processing, medicine, bioengineering, and so forth. Various materials have been researched and developed to be used as nonlinear optical media and electrooptical media in such optical devices. Substrates of oxide compounds such as lithium niobate (LN: $LiNbO_3$) are known as promising materials, with extremely high secondary nonlinear optical constants and electrooptical constants. Periodically poled lithium niobate (PPLN) is known as an example of an optical device using the high nonlinearity of LN, and there are known wavelength conversion elements using second-harmonic generation (SHG), difference-frequency generation (DFG), and sum-frequency generation (SFG) of this PPLN.

For example, there is demand for development of a small-sized mid-wavelength infrared light source, since there are strong absorbent lines that exhibit normal mode regarding various environmental gasses in the 2 to 5 μm mid-wavelength infrared region. For such a mid-wavelength infrared region light source, DFG, where technologically-mature light sources of pump light around 1 μm and communication-waveband signal light can be used, is thought to be promising. There also is a wavelength region where realization by semiconductor laser is difficult in the wavelength region of visible light around 0.5 μm. Accordingly wavelength conversion technology where visible light such as green light or the like can be generated by SHG or SFG, using light sources of pump light around 1 μm, is thought to be promising.

The wavelength conversion technology using DFG enables batch conversion of light of the 1.55 μm waveband, used primarily to optical fiber communication, to a different waveband. Accordingly the wavelength conversion technology is applicable to routing of light in wavelength division multiplexing, wavelength collision avoidance in optical routing, and so forth. A wavelength conversion apparatus is thought to be a key device in constructing a high-capacity communication optical network. In wavelength conversion using DFG, compensation of signal distortion can be performed using the fact that the converted light becomes phase-conjugate light as to the signal light. When the signal light is converted to phase-conjugate light around the midway point of the transmission path, dispersion occurring in the transmission path before conversion into phase-conjugate light and signal distortion occurring in the fiber due to the nonlinear optical effect cancel each other out during propagation through the transmission path after conversion into phase-conjugate light. Accordingly, the wavelength conversion apparatus is thought to be one of key devices that can reduce dispersion and nonlinear signal distortion.

Using a wavelength conversion element that has a high wavelength conversion efficiency enables a signal light amplifier referred to as optical parametric amplification occurs by energy transition from pump light power to signal light to be configured. Particularly, phase-sensitive amplifiers that have amplification characteristics corresponding to the phase relation between the pump light and signal light are anticipated as a technology enabling low-noise optical amplification. An optical waveguide type device is effective in obtaining high efficiency using PPLN. This is because the wavelength conversion efficiency is proportionate to the power density of light propagated through the nonlinear medium, and light can be confined to a limited range by forming a waveguide structure. Accordingly, various types of waveguides using nonlinear media are being researched and developed.

Study has been performed so far using diffused-type waveguides, referred to as Ti diffused waveguides and proton-exchanged waveguides. However, these waveguides involve diffusing impurities in crystals during fabrication, and accordingly there have been issues from the perspectives of photodamage resistance and long-term reliability. There has been a limit in the optical power that could be input to the waveguide with diffused type waveguides, since inputting high-intensity light into the waveguide generates crystal damage due to the photorefractive effect.

In recent years, research and development is being performed on ridge-type optical waveguides, that have features of high photodamage resistance, long-term reliability, ease of device design, and so forth, due to bulk properties of crystals being usable without alteration. A method is known for fabricating a ridge-type optical waveguide where two substrates are bonded using an adhesive agent, one substrate is formed into a thin film and thereafter ridges are formed, thereby fabricating a ridge-type optical waveguide. However, the method of bonding substrates to each other by adhesive agent has a problem in that cracking of the thin film occurs under change in temperature, due to the thermal expansion coefficients of the adhesive agent and the substrates being different. Additionally, there is a problem in that waveguide loss during operation increases due to deterioration of the adhesive agent by second-harmonic light generated in the waveguide, and efficiency of wavelength conversion deteriorates. Moreover, there is a problem in that the film thickness of the single-crystal film becomes non-uniform due to non-uniformity of the adhesive layer, and the phase-matching wavelength of the wavelength conversion element deviates.

Separately, there is known direct-bonding technology as a technology for powerfully bonding substrates to each other without using an adhesive agent. In direct bonding, wafers subjected to surface processing in advance using chemicals are overlaid on each other, and bonded by surface attraction. Bonding is performed at room temperature, but since the strength of bonding of the wafers is small at this time, thermal processing is performed at high temperatures to raise the bonding strength. In addition to features such as high photodamage resistance, long-term reliability, ease of device design, and so forth, direct-bonding technology is viewed as being promising from the point of being able to avoid inclusion of impurities and absorption by adhesive agent and so forth in the mid-wavelength infrared region light generation by DFG described above.

Further, direct-bonding technology is not limited to non-linear optical devices, and application to high-power optical modulators is also anticipated. Substrates of oxide compounds such as LN have large electrooptical constants in addition to secondary nonlinear optical constants, and are broadly used as optical modulators using the electrooptical effect (EO effect). However, high-power light input of no less than 100 mW has been difficult with conventional optical modulators using Ti diffused waveguides. In contrast, optical modulators using direct-bonding technology are capable of Watt-order light input. Accordingly application to generating high-light-intensity optical modulation signals, laser processing technology and so forth can be anticipated.

Direct bonding requires thermal processing at high temperatures around 400° C., and accordingly wafers that can be bonded to each other need to have good flatness of the surfaces, and moreover thermal expansion rates that are close. Accordingly, direct-bond formation by substrates of the same type of material, such as LN, and LN to which additives, such as lithium tantalate ($LiTaO_3$), Mg, Zn, Sc, In, Fe, and so forth, are added, have been studied.

Ridge-type optical waveguides have a core formed in accordance with a waveguide pattern on a base substrate, and have a stepped refractive index distribution (e.g., see NPL 1). The three side faces of the core that are not in contact with the base substrate are in contact with an air layer. Ridge-type optical waveguides can operate even if portions above and to the sides of the core are the air layer (refractive index of 1). However, there is a problem in practical use having the core layer exposed, in that there is concern that characteristics may change over time due to adhesion of airborne foreign matter and dust, and so forth. There are also cases where an overcladding layer serving as a protective layer is provided, taking into consideration mechanical strength necessary for forming a film such as an AR coat or the like on an edge face of the optical waveguide.

A periodically poled structure is a structure for performing quasi phase matching. This technique where crystal orientation is reversed at each coherence length of the fundamental wave and wavelength-converted wave, compensates for the amount of phase mismatch by reversing the sign of a nonlinear constant. The practical value of being able to perform wavelength conversion over a broad range, from the mid-wavelength infrared range to the visible light range, without using special nonlinear optical crystals, is high.

CITATION LIST

Non Patent Literature

[NPL 1] T. Umeki, O. Tadanaga, and M. Asobe, 'Highly Efficient Wavelength Converter Using Direct-Bonded PPZnLN Ridge Waveguide,' 2010 IEEE Journal of Quantum Electronics, Vol. 46, No. 8, pp. 1206-1213

SUMMARY OF THE INVENTION

Technical Problem

Generally, the refractive index of nonlinear optical materials has temperature dependency. In order to stringently satisfy quasi phase matching conditions in a secondary nonlinear optical element, there is a need to maintain the temperature of the element constant. Normally, a temperature detector such as a thermistor or thermocouple or the like is disposed on the secondary nonlinear optical element or nearby, to monitor resistance values and so forth thereof. The monitor results are fed back, a temperature regulator such as a heater, Peltier device, or the like, is controlled to maintain the secondary nonlinear optical element at a constant temperature, and the secondary nonlinear optical element is operated in this state.

However, there have been issues in precise stabilization of the secondary nonlinear optical element with only the conventional mechanism to control a temperature regulator so as to make the monitor value of the temperature detector to be constant. Specifically, what a temperature detector such as a thermistor or thermocouple or the like can monitor is an average temperature of the overall secondary nonlinear optical element, and the temperature detector does not monitor the temperature of the waveguide portion that exhibits nonlinear optical effects. Accordingly, there have been cases where only monitoring the temperature of the temperature detector cannot cause the secondary nonlinear optical element to be stringently operated at an optimal temperature.

For example, in a case where the environmental temperature (temperature of the ambient atmosphere) of the optical device changes, even if temperature control is performed so that the temperature of the temperature detector disposed on the secondary nonlinear optical element or nearby is constant, the temperature control is slightly affected by change in the environmental temperature, and the optimal operation point is shifted. Because the core that is situated at the surface of the element and through which light is propagated has three side faces not in contact with the base substrate that are in contact with the air layer. Also, in a case of inputting strong pump light into the waveguide to yield high conversion efficiency or high-gain parametric amplification of light, optical absorption of pump light input into the waveguide generates heat. This heat generation is local heat generation on the waveguide portion, and cannot be monitored by a temperature detector disposed on the element or nearby. Thus, it has been difficult to correctly compensate for shifting in the optimal operation point due to local heating.

Means for Solving the Problem

It is an object of the present invention for a wavelength conversion apparatus using a nonlinear optical medium having a periodically poled structure to operate at an optimal temperature in a stable manner.

In order to achieve such an object, an aspect of the present invention is a wavelength conversion apparatus including a wavelength converter using a nonlinear optical medium and a controller for controlling temperature of the wavelength converter. The wavelength conversion apparatus includes a first optical branch coupler for branching part of output light from the wavelength converter, and first and second wavelength separation filters for separating and outputting, from part of the output light, each of two light components generated by parametric fluorescence in the wavelength converter. The controller controls the temperature of the wavelength converter on the basis of difference in light intensity of the two light components.

Effects of the Invention

As described above, according to the present invention, the temperature of the wavelength converter is controlled on the basis of difference in light intensity of the two light components separated from part of the output light. Accordingly temperature of the nonlinear optical medium can be accurately monitored, whereby the wavelength conversion apparatus can be operated at an optimal temperature.

DESCRIPTION OF EMBODIMENTS

Embodiments of the present invention will be described in detail below with reference to the figures. The present embodiment will be described by way of an example of a wavelength conversion apparatus that includes a wavelength converter made up of a ridge-type optical waveguide using a nonlinear optical medium, and that performs wavelength conversion, phase conjugation, and parametric amplification of converted light.

Embodiment 1

Figure 1:
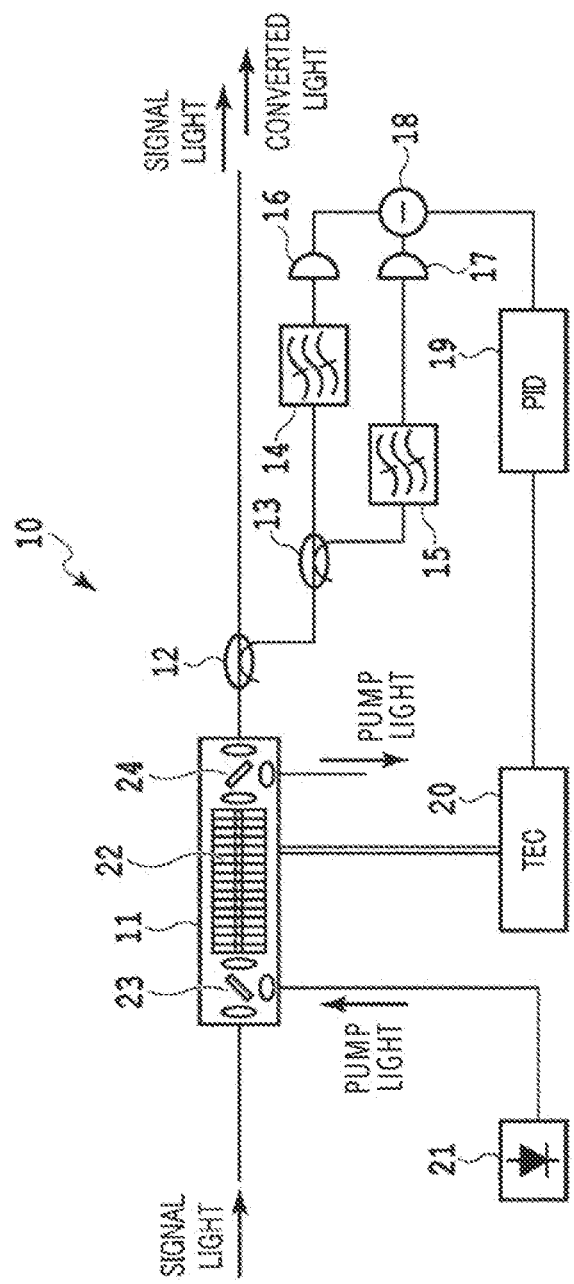
FIG. 1 is a diagram illustrating a configuration of a wavelength conversion apparatus according to a first embodiment.

FIG. 1 illustrates a configuration of a wavelength conversion apparatus according to Embodiment 1. In the wavelength conversion apparatus 10, a first optical branch coupler 12 and a second optical branch coupler 13 are serially connected to the output of a wavelength converter 11, and first and second wavelength separation filters 14 and 15 are respectively connected to the two outputs of the second optical branch coupler 13. Respectively connected to the outputs of the first and second wavelength separation filters 14 and 15 are first and second light intensity detectors 16 and 17, and a controller (PID) 19 is connected via a differentiator 18. A temperature regulator (TEC) 20 is thermally coupled to the wavelength converter 11, and temperature of the wavelength converter 11 is controlled by control current from the controller 19.

The wavelength converter 11 includes a lithium niobate (PPLN) waveguide 22 having a periodically poled structure that satisfies quasi phase matching between input signal light and pump light, and output converted light, a dichroic mirror multiplexer 23 that multiplexes signal light and pump light to be input to the PPLN waveguide 22, and a dichroic mirror demultiplexer 24 that demultiplexes pump light from the output of the PPLN waveguide 22. A nonlinear optical medium of $LiNbO_3$, $LiTaO_3$, $LiNb_{(x)}Ta_{(1-x)}O_3$ ($0 \leq x \leq 1$), or these including at least one type of additive selected from a group of Mg, Zn, Sc, and In, is used as the wavelength converter 11.

Next, operations of the wavelength conversion apparatus according to Embodiment 1 will be described along with functions of each of the parts. Light signals made up of a plurality of wavelengths are input as signal light input to the wavelength conversion apparatus 10. In Embodiment 1, wavelength-multiplexed signals (WDM signals) are input. In the wavelength converter 11, the dichroic mirror multiplexer 23 multiplexes the WDM signals and pump light from an pump light source 21, and inputs to the PPLN waveguide 22. The PPLN waveguide 22 generates converted light of the WDM signals by difference-frequency generation (DFG).

With the frequency of pump light written as $2\omega_0$, and the frequency of a first wavelength of the WDM signals written as $\omega s$, converted light of frequency $2\omega_0 - \omega s$ is generated by difference-frequency generation in the PPLN waveguide 22. With the phase of pump light written as $\Phi p$, and the phase of signal light written as $\Phi s$, the phase of the converted light is $\Phi p - \Phi s$ by difference-frequency generation, and phase-conjugate light of the signal light is generated with the phase of the pump light as a reference. With a wavelength double the pump light (frequency: $\omega_0$) as the fundamental-wave wavelength, the plurality of signal light contained in the WDM signals is generated as converted light of a wavelength folded back with the fundamental-wave wavelength as a center wavelength axis. At the same time that converted light is generated, energy from the pump light is transferred to the WDM signals as well, and the signal light is amplified.

The converted light generated by the PPLN waveguide 22 is input to the dichroic mirror demultiplexer 24 along with the WDM signals where pump light is multiplexed. The dichroic mirror demultiplexer 24 separates the pump light from the light output from the PPLN waveguide 22. The dichroic mirror demultiplexer 24 outputs the light from which the pump light is separated (amplified WDM signals+ converted light of WDM signals) to the first optical branch coupler 12 as output light of the wavelength converter 11.

The first optical branch coupler 12 branches part (around 1% to 10%) of the light intensity of the output light (amplified WDM signals and converted light of WDM signals). The branched light is further branched into two by the second optical branch coupler 13. The first and second wavelength separation filters 14 and 15 are band-pass filter (BPF) type optical filters that transmit light of just a certain wavelength component, and the transmitted wavelengths of each of the first and second wavelength separation filters 14 and 15 are different. The light intensity of the output light from the first and second wavelength separation filters 14 and 15 is detected by the first and second light intensity detectors 16 and 17, respectively.

In a case of extracting "converted light of WDM signals" as the other output of the first optical branch coupler 12, the wavelength conversion apparatus 10 serves as a wavelength converter and a phase-conjugate converter. In a case of extracting "amplified WDM signal light", the wavelength conversion apparatus 10 serves as an optical parametric amplifier.

Figure 2A:
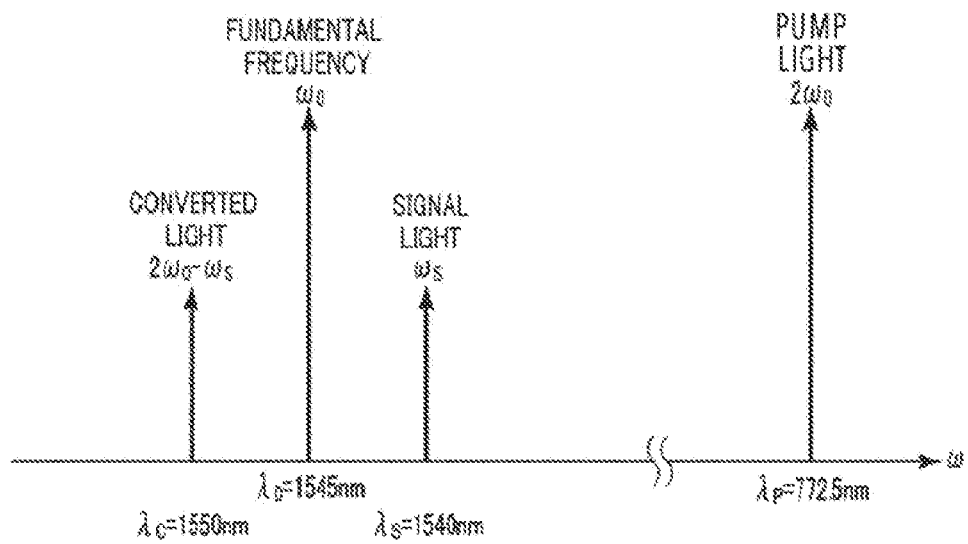
FIG. 2 is a diagram illustrating the relation in frequency between pump light, signal light, and converted light.

FIG. 2 is a diagram illustrating the relation in frequency between pump light, signal light, and converted light. Specifically, FIG. 2 describes the wavelength conversion bandwidth of the PPLN waveguide 22 in a case where the fundamental-wave wavelength $\lambda_0$ (frequency: $\omega_0$) is 1545 nm, and the pump light wavelength $\lambda p$ (frequency: $2\omega_0$) is 772.5 nm. Note that the element length of the PPLN waveguide 22 was 42 mm. Inputting pump light and signal light generates converted light by the difference-frequency generation of the PPLN waveguide 22. For example, if the signal light wavelength $\lambda s$ (frequency: $\omega s$) is 1540 nm, converted light with wavelength $\lambda c$ of 1550 nm is generated by $2\omega_0 - \omega s$, as illustrated in FIG. 2(a). Converted light is generated in a manner of folding back on the wavelength axis with the fundamental-wave wavelength $\lambda_0$ as the center.

In the PPLN waveguide 22, quasi phase matching conditions are satisfied among the three waves of the pump light, signal light, and converted light. The PPLN waveguide 22 has a poled structure with a reversal cycle Λ that satisfies $$np/\lambda p - ns/\lambda s - nc/\lambda c = 1/\Lambda \qquad \text{(Expression 1)}$$

where np, ns, and nc, respectively represent the effective refractive indices of the pump light, signal light, and converted light, in the waveguide.

As long as (Expression 1) is satisfied, the same conversion efficiency is yielded between the converted light and pump light of frequency $2\omega_0 - \omega s$, even if the signal light wavelength is changed. For example, if the signal light wavelength λs (frequency: ωs) is 1539 nm, converted light of wavelength 1551 nm is generated, due to $2\omega_0 - \omega s$. At this time, the effective refractive indices ns and nc also change, but nc becomes smaller in accordance with ns becoming larger from dispersion due to the material. Accordingly (Expression 1) can be satisfied even if the signal light wavelength is changed, and the PPLN waveguide 22 has an advantage that a broad wavelength conversion bandwidth can be obtained.

However, the form of this bandwidth before and after wavelength conversion is satisfied when the operating temperature of the wavelength converter 11 is correct, but the bandwidth form changes if the operating temperature deviates from the correct value. In a case of temperature change, each of the effective refractive indices np, ns, and nc change, and the wavelength conversion bandwidths obtained in accordance with the change also change.

Figure 3:
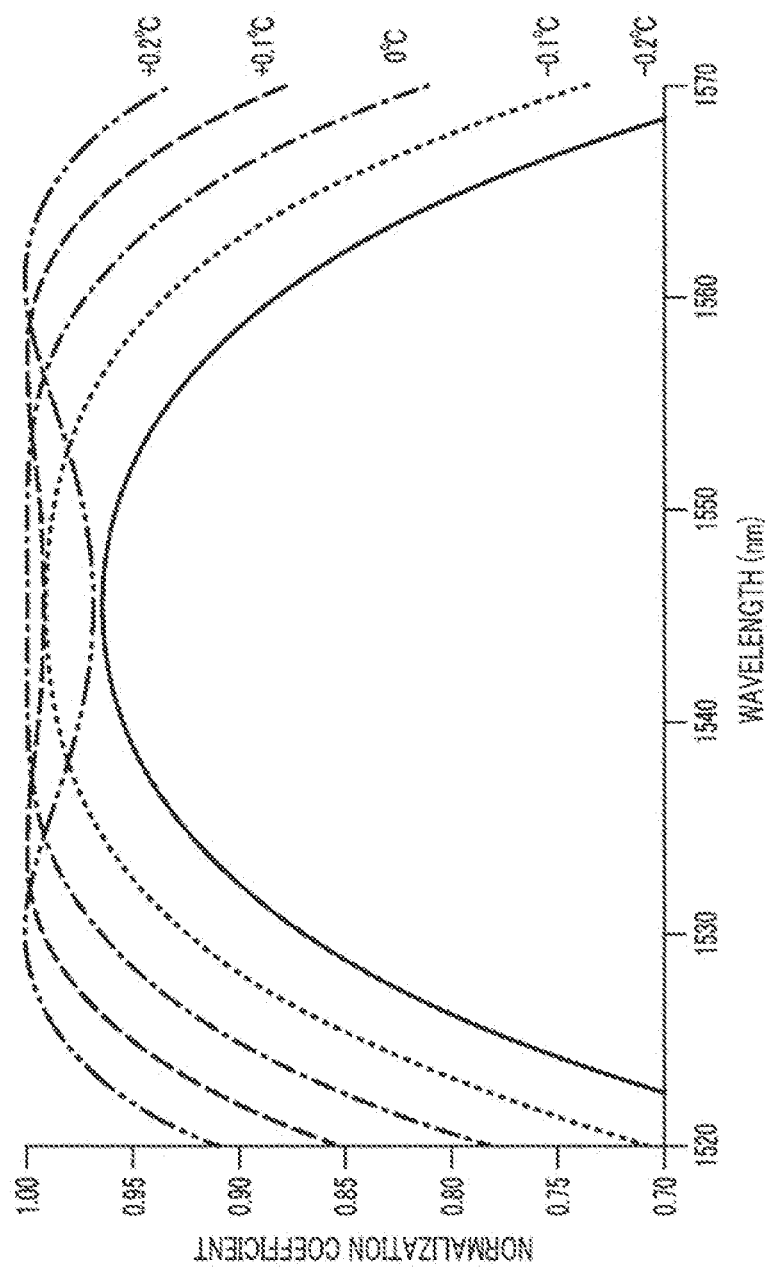
FIG. 3 is a diagram illustrating the way in which wavelength conversion bandwidth changes with regard to change in operating temperature.

FIG. 3 is a diagram illustrating the way in which wavelength conversion bandwidth changes with regard to change in operating temperature. In the figure, the light intensity of the wavelength conversion bandwidth of the above-described conditions is normalized to light intensity when temperature change is 0° C. A method of monitoring one converted light of the WDM signals and optimizing the operating temperature is conceivable. However, the temperature dependency of the light intensity differs depending on the wavelength of the converted light, and accordingly a control method of whether to raise the temperature or lower the temperature is not so easily found. A method of monitoring all converted light and optimizing the operating temperature is conceivable, but the number of parts would increase, and control would become complicated. Also, when there is fluctuation in power of the signal light being input, the converted light intensity fluctuates accordingly, so control would become even more complicated when assuming external input.

Accordingly, in the present embodiment, the optimal operating temperature is controlled using a phenomenon unique to PPLN waveguides. Specifically, two light components converted from pump light by parametric fluorescence are used. Parametric fluorescence is a spontaneous parametric process where if there is spontaneous emission light (ASE light) from the medium, the pump light converts into light of two lower frequencies even if there is no input of signal light. Specifically, when pump light of frequency $2\omega_0$ is input to a secondary nonlinear optical medium, the pump light is converted into light of two frequencies that satisfy $\omega_1 + \omega_2 = 2\omega_0$, i.e., parametric fluorescence.

Figure 2B:
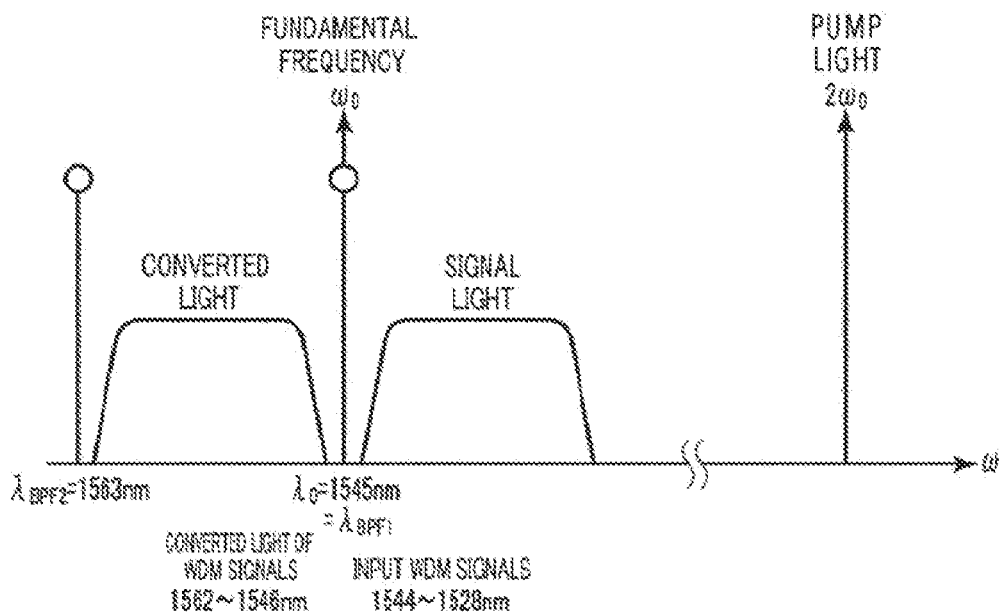

The first and second wavelength separation filters 14 and 15 are BPF type optical filters that transmit just certain frequency components. The wavelength separation filters 14 and 15 respectively transmit just the two light components generated by parametric fluorescence in the wavelength converter 11, which have two different wavelengths in a region where there is no conversion from WDM signals. The two wavelengths are a center wavelength (frequency: $\omega_1$) that is at the fundamental-wave wavelength or very close, and a wavelength (frequency: $\omega_2$) that is at the edge portion of the conversion bandwidth of converted light of WDM signals, with the fundamental-wave wavelength as a reference. Thus, the wavelength conversion apparatus can control the form of the wavelength conversion bandwidth, which will be described below. Specifically, as illustrated in FIG. 2(b), when the input WDM signals was 1528 to 1544 nm, the "converted light of WDM signals" was converted to wavelength 1546 to 1562 nm. The center transmission wavelength $\lambda_{BPF1}$ of the first wavelength separation filter 14 was set to 1545 nm (i.e., the same as the fundamental frequency $\lambda_0$) and the center transmission wavelength $\lambda_{BPF2}$ of the second wavelength separation filter 15 was set to 1563 nm.

The center transmission wavelengths of the first and second wavelength separation filters 14 and 15 are set at both edges of the wavelength conversion bandwidth of the WDM signals, as described above. The light intensities of the two light components generated by parametric fluorescence are detected by the first and second light intensity detectors 16 and 17. The wavelength conversion apparatus can correct change in the form of the wavelength conversion bandwidth due to temperature change, using these detection results.

Figure 4:
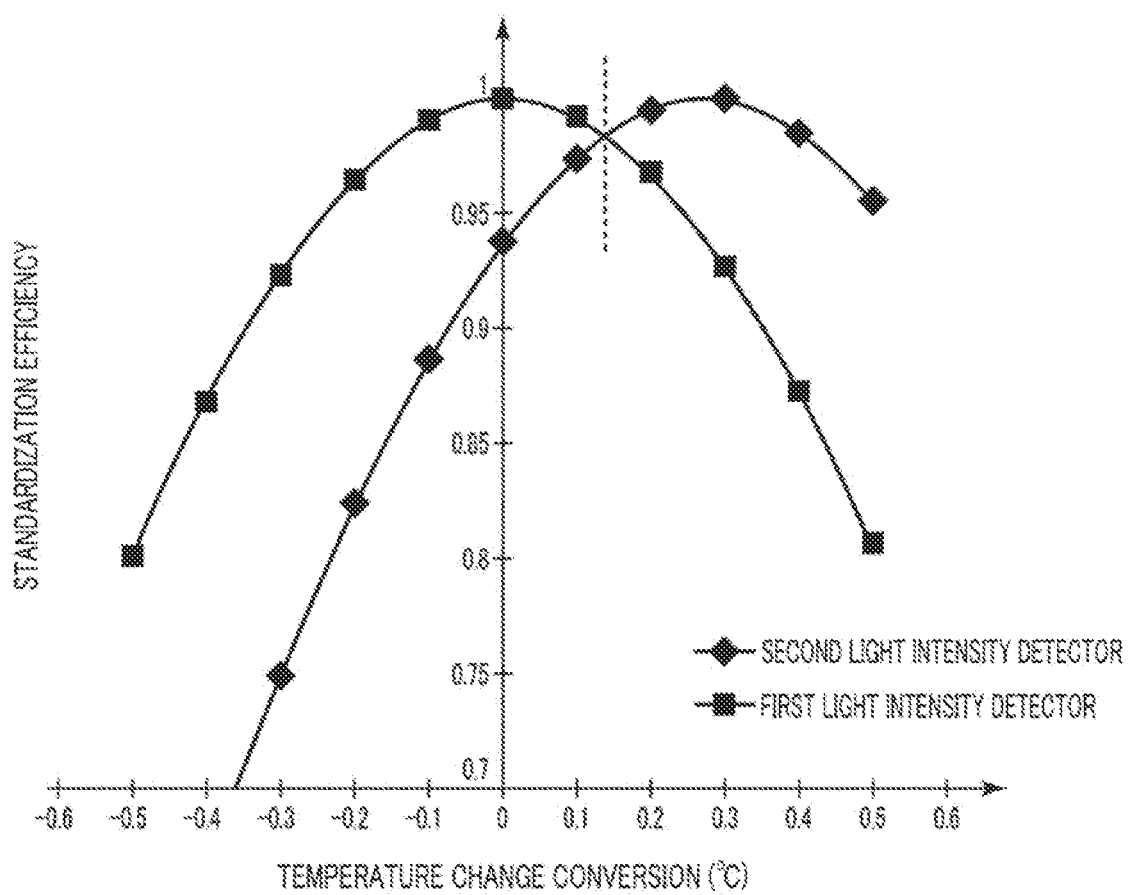
FIG. 4 is a diagram illustrating standardized light intensity at first and second light intensity detectors with regard to change in temperature.

FIG. 4 is a diagram illustrating standardized light intensity at the first and second light intensity detectors with regard to change in temperature. The light intensity at the first light intensity detector 16 decreases regardless of whether the temperature rises or falls. The light intensity at the second light intensity detector 17 decreases if the temperature falls, but temporarily increases if the temperature rises. The maximum intensity is obtained at the high-temperature side, and thereafter the light intensity decreases as the temperature rises further. A temperature where the light intensities detected at the first light intensity detector 16 and the second light intensity detector 17 are the same (0.14° C. in FIG. 4) is taken as a reference temperature. At this time, it can be seen from the way in which light intensity changes that the light intensity of the first light intensity detector 16 decreases when higher than the reference temperature, and increases when lower. Conversely, it can be seen that the light intensity of the second light intensity detector 17 increases when higher than the reference temperature, and decreases when lower. The difference between these two detectors can be detected and feedback control performed so that the temperature of the wavelength converter 11 is the reference temperature.

The wavelength conversion apparatus 10 detects the difference in light intensity of these two light intensity detectors via the differentiator 18, and after calculation by PID control by the controller 19, performed feedback to the control current of the temperature regulator 20. As a result, the intensity of the wavelength converted light was stabilized within 0.2 dB over the entire bandwidth. Although two wavelengths (wavelengths near the center wavelength and at the edge portion of the wavelength conversion bandwidth) were monitored in Embodiment 1, three or more wavelengths may be monitored.

Embodiment 2

Assumption was made in Embodiment 1 that wavelength-multiplexed signals (WDM signals) that are light signals made up of a plurality of wavelengths are input as input light, and that transmission wavelengths of the first and second wavelength separation filters are not included in the input light. However, in practice, the input light can be assumed to be present in the transmission wavelengths. For example, WDM signals propagated in optical fiber communication are repeatedly subjected to loss due to the fiber transmission path and optical amplification by optical amplifiers, and accordingly ASE light from the optical amplifiers is superimposed. There has been a problem where, in a case where it cannot be said that the light quantity of superimposed ASE light is sufficiently small in comparison with the light quantity of parametric fluorescence in the wavelength converter, correct temperature control is difficult with the configuration described in Embodiment 1.

Figure 5:
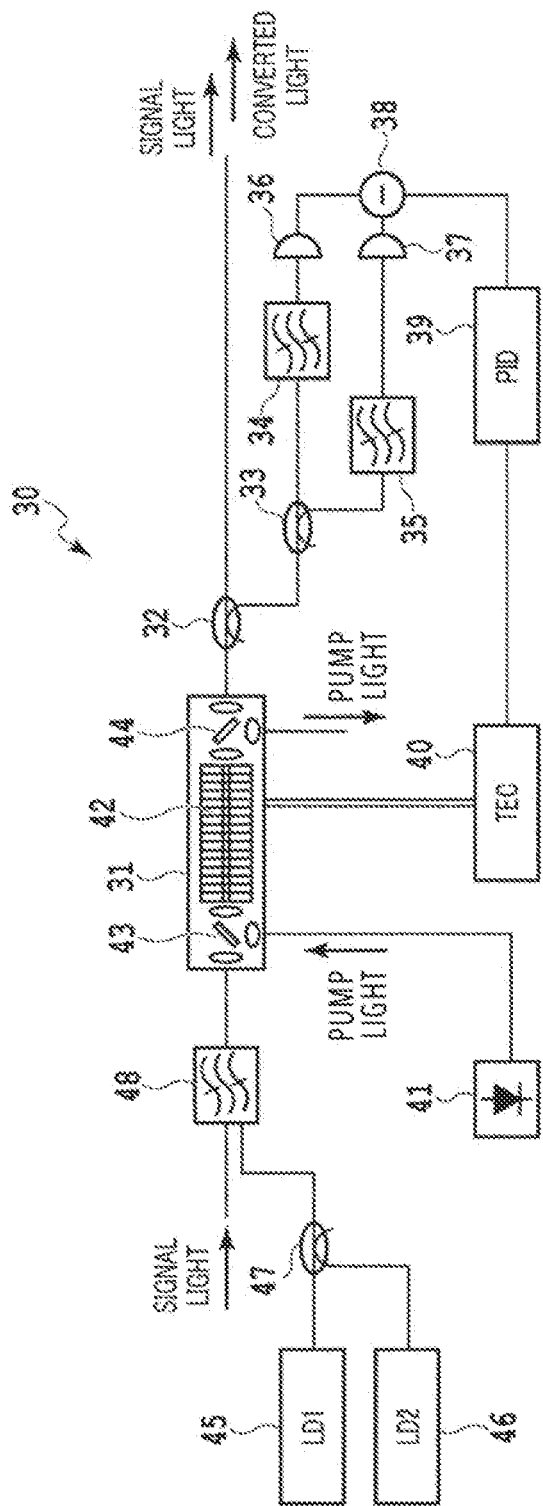
FIG. 5 is a diagram illustrating a configuration of a wavelength conversion apparatus according to a second embodiment.

FIG. 5 illustrates a configuration of a wavelength conversion apparatus according to Embodiment 2. In a wavelength conversion apparatus 30, a first optical branch coupler 32 and a second optical branch coupler 33 are serially connected to the output of a wavelength converter 31. First and second wavelength separation filters 34 and 35 are respectively connected to the two outputs of the second optical branch coupler 33. Respectively connected to the outputs of the first and second wavelength separation filters 34 and 35 are first and second light intensity detectors 36 and 37, and a controller (PID) 39 is connected via a differentiator 38. A temperature regulator (TEC) 40 is thermally coupled to the wavelength converter 31, and temperature of the wavelength converter 31 is controlled by control current from the controller 39.

The wavelength conversion apparatus 30 further includes first and second control-light light sources 45 and 46, a first optical multiplexer/demultiplexer 47 that multiplexes the output of these two control-light light sources, and a second optical multiplexer/demultiplexer 48 that multiplexes the signal light (WDM signals) and the output of the first optical multiplexer/demultiplexer 47, and inputs to the wavelength converter 31. The second optical multiplexer/demultiplexer 48 has band-pass type optical filter characteristics having a bandwidth equivalent to the wavelength bandwidth of the WDM signals, multiplexes only the signal light in the WDM signal bandwidth out of the input signal light with the output of the first optical multiplexer/demultiplexer 47, and attenuates light outside of this bandwidth and spontaneous emission light.

The wavelength converter 31 includes a PPLN waveguide 42 having a periodically poled structure that satisfies quasi phase matching between input signal light and pump light, and outputs converted light, a dichroic mirror multiplexer 43 that multiplexes signal light and pump light from an pump light source 41 and inputs to the PPLN waveguide 42, and a dichroic mirror demultiplexer 44 that demultiplexes pump light from the output of the PPLN waveguide 42.

The wavelengths ($\omega_{i1}$, $\omega_{i2}$) of the first and second control-light sources 45 and 46 respectively match the transmission wavelength of the first and second wavelength separation filters 34 and 35. Alternatively, the wavelengths ($\omega_{i1}$, $\omega_{i2}$) of the first and second control-light light sources 45 and 46 are wavelengths corresponding to light frequencies that satisfy (Expression 2) regarding light frequency $2\omega_0$ of pump light, where light frequencies corresponding to the transmission wavelengths of the first and second wavelength separation filters 34 and 35 are respectively written as $\omega_1$ and $\omega_2$.

$$\omega_{i1} = 2\omega_0 - \omega_1$$

$$\omega_{i2} = 2\omega_0 - \omega_2 \quad \text{(Expression 2)}$$

As a specific example of wavelength layout, when the fundamental-wave wavelength $\lambda_0$ (frequency: $\omega_0$) is 1545 nm, and the transmission wavelengths of the first and second wavelength separation filters 34 and 35 is 1545.5 nm and 1563 nm, respectively. The wavelengths of the control light of the first and second control-light sources 45 and 46 are 1545.5 nm and 1563 nm, or are 1544.5 nm and 1527 nm.

The wavelength conversion apparatus 30 thus detects the light intensity of control light or light wavelength-converted from control light, by the first and second light intensity detectors 36 and 37. The wavelength conversion apparatus 30 detects the difference in light intensity of these two light intensity detectors via the differentiator 38, and after calculation by PID control by the controller 39, performed feedback to the control current of the temperature regulator 40. As a result, the intensity of the wavelength converted light was stabilized within 0.2 dB over the entire bandwidth.

Embodiment 3

In Embodiments 1 and 2, wavelength-multiplexed signals (WDM signals) that are light signals made up of a plurality of wavelengths were input as input light, and wavelength conversion and optical parametric amplification based on difference-frequency generation regarding pump light was used. The wavelength conversion and optical parametric amplification are also used in operation stabilization of wavelength conversion based on sum-frequency generation, and accordingly second-harmonic generation, which is one of sum-frequency generation processes, will be described as an example.

Figure 6:
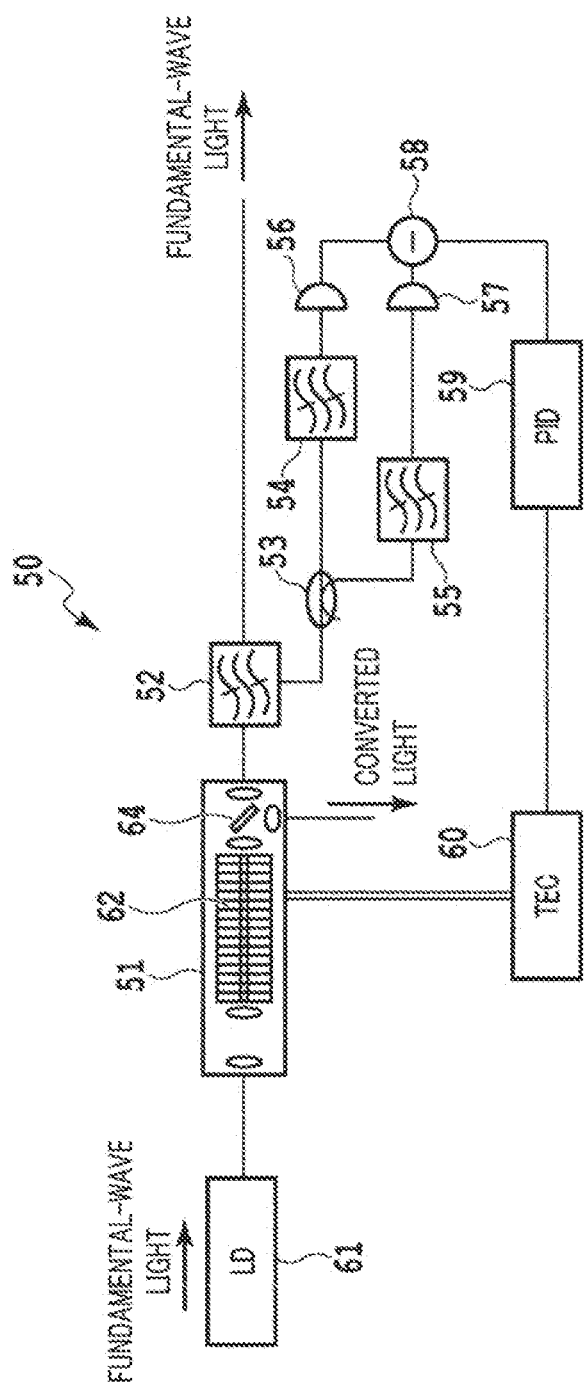
FIG. 6 is a diagram illustrating a configuration of a wavelength conversion apparatus according to a third embodiment.

FIG. 6 illustrates a configuration of a wavelength conversion apparatus according to Embodiment 3. In a wavelength conversion apparatus 50, a first optical branch coupler 52 and a second optical branch coupler 53 are serially connected to the output of a wavelength converter 51, and first and second wavelength separation filters 54 and 55 are respectively connected to the two outputs of the second optical branch coupler 53. Respectively connected to the outputs of the first and second wavelength separation filters 54 and 55 are first and second light intensity detectors 56 and 57, and a controller (PID) 59 is connected via a differentiator 58. A temperature regulator (TEC) 60 is thermally coupled to the wavelength converter 51, and temperature of the wavelength converter 51 is controlled by control current from the controller 59.

The wavelength converter 51 includes a PPLN waveguide 62 that has a periodically poled structure that satisfies quasi phase matching between fundamental wave light input from a fundamental-wave-light light source 61 and second-harmonic light, and a dichroic mirror demultiplexer 64 that demultiplexes fundamental wave light and second-harmonic light.

With the frequency of the fundamental wave light as $\omega_0$, converted light of frequency $2\omega_0$ is generated by second-harmonic generation in the PPLN waveguide 62. The dichroic mirror demultiplexer 64 separates light of the fundamental wave light wavelength band and the converted light (second-harmonic light) from the output of the PPLN waveguide 62, and outputs light of the fundamental wave light wavelength band to the first optical branch coupler 52.

In the PPLN waveguide 62, converted light (second-harmonic light) generated in the PPLN waveguide 62 itself becomes pump light, and parametric fluorescence occurs. The dichroic mirror demultiplexer 64 separates the fundamental wave light and this parametric fluorescence from the converted light (second-harmonic light). Note that the first optical branch coupler 52 has band-pass filter (BPF) type optical filter characteristics having a bandwidth equivalent to the bandwidth of the frequency band of the fundamental wave light, and can extract the fundamental wave light from the output of the wavelength converter 51.

The first and second wavelength separation filters 54 and 55 are BPF type optical filters that transmit just a certain wavelength component, and the transmitted wavelengths of each are different. The first and second wavelength separation filters 54 and 55 have transmission wavelengths corresponding to the wavelengths of the two light components generated by parametric fluorescence, branched from the first optical branch coupler 52. The first and second light intensity detectors 16 and 17 respectively detect the light intensities of these two light components.

The same method as in Embodiment 1 can be used for wavelength layout. The wavelength conversion apparatus 50 detects the difference in light intensity of the two light intensity detectors via the differentiator 58, and after calculation by PID control by the controller 59, performs feedback to the control current of the temperature regulator 60, and thus can keep the bandwidth of the wavelength converter stable.

Although description was made using second-harmonic generation in Embodiment 3, this is the same as a case of sum-frequency generation using output of the two light sources as first and second fundamental wave light, respectively.

REFERENCE SIGNS LIST 10, 30, 50 Wavelength conversion apparatus
11, 31, 51 Wavelength converter
12, 32, 52 First optical branch coupler
13, 33, 53 Second optical branch coupler
14, 34, 54 First wavelength separation filter
15, 35, 55 Second wavelength separation filter
16, 36, 56 First light intensity detector
17, 37, 57 Second light intensity detector
18, 38, 58 Differentiator
19, 39, 59 Controller (PID)
20, 40, 60 Temperature regulator (TEC)
21, 41 Pump light source
22, 42, 62 PPLN waveguide
23, 43 Dichroic mirror multiplexer
24, 44, 64 Dichroic mirror demultiplexer
45 First control-light light source
46 Second control-light light source
61 Fundamental-wave-light light source

The invention claimed is:

1. A wavelength conversion apparatus including a wavelength converter using a nonlinear optical medium and a controller for controlling temperature of the wavelength converter, comprising:
a first optical branch coupler for branching part of output light from the wavelength converter; and
first and second wavelength separation filters for separating and outputting, from part of the output light, each of two light components generated by parametric fluorescence in the wavelength converter,
wherein the controller controls the temperature of the wavelength converter on the basis of difference in light intensity of the two light components.

2. The wavelength conversion apparatus according to claim 1, further comprising first and second light intensity detectors for detecting light intensity of the two light components respectively,
wherein, as a reference temperature where light intensity detected by the first and second light intensity detectors being equal, the controller controls a temperature of the wavelength converter to the reference temperature.

3. The wavelength conversion apparatus according to claim 1, wherein wavelength-multiplexed signals are input to the wavelength converter as signal light, and with a wavelength double a wavelength of pump light as a fundamental-wave wavelength, a first wavelength that is the fundamental-wave wavelength or very close thereto, and a second wavelength at an edge portion of a conversion bandwidth of converted light of the wavelength-multiplexed signals generated by difference-frequency generation with the fundamental-wave wavelength as a reference, are selected as the two wavelengths of light.

4. The wavelength conversion apparatus according to claim 1, wherein the nonlinear optical media is LiNbO3, LiTaO3, LiNb(x)Ta(1−x)O3 (0≤x≤1), or these including at least one type of additive selected from a group of Mg, Zn, Sc, and In.

5. A wavelength conversion apparatus including a wavelength converter using a nonlinear optical medium and a controller for controlling temperature of the wavelength converter, comprising:
first and second control-light light sources, each control-light light source outputting a control light to be multiplexed with wavelength-multiplexed signals input to the wavelength converter as signal light;
a first optical branch coupler for branching part of output light from the wavelength converter; and
first and second wavelength separation filters for separating and outputting, from part of the output light, each of two light components with a first wavelength that is the fundamental-wave wavelength or very close thereto, and a second wavelength at an edge portion of a conversion bandwidth of converted light of the wavelength-multiplexed signals generated by difference-frequency generation with the fundamental-wave wavelength as a reference, with a wavelength double a wavelength of pump light as a fundamental-wave wavelength,
wherein the controller controls the temperature of the wavelength converter on the basis of difference in light intensity of the two light components output from the first and second wavelength separation filters.

6. The wavelength conversion apparatus according to claim 5, wherein wavelengths (ωi1, ωi2) of the first and second control-light sources match a transmission wavelength of the first and second wavelength separation filters, or satisfy the expression $$\omega i1 = 2\omega 0 - \omega 1$$

$$\omega i2 = 2\omega 0 - \omega 2$$

regarding light frequency 2ω0 of the pump light, where ω1 and ω2 represent light frequencies respectively corresponding to the transmission wavelengths of the first and second wavelength separation filters.

7. The wavelength conversion apparatus according to claim 5, wherein the nonlinear optical media is LiNbO3, LiTaO3, LiNb(x)Ta(1−x)O3 (0≤x≤1), or these including at least one type of additive selected from a group of Mg, Zn, Sc, and In.

8. A wavelength conversion apparatus including a wavelength converter using a nonlinear optical medium and a controller that controls temperature of the wavelength converter, comprising:
a fundamental-wave-light light source for outputting fundamental-wave light to the wavelength converter;

a first optical branch coupler for branching part of output light from the wavelength converter; and first and second wavelength separation filters for separating and outputting, from part of the output light, each of two light components generated by parametric fluorescence in the wavelength converter, wherein the controller controls the temperature of the wavelength converter on the basis of difference in light intensity of the two light components.

9. The wavelength conversion apparatus according to claim 8, wherein the wavelengths of the two light components are wavelengths of parametric fluorescence occurring in converted light generated from the fundamental-wave light by second-harmonic generation.

10. The wavelength conversion apparatus according to claim 8, wherein the nonlinear optical media is $LiNbO_3$, $LiTaO_3$, $LiNb(x)Ta(1-x)O_3$ ($0 \leq x \leq 1$), or these including at least one type of additive selected from a group of Mg, Zn, Sc, and In.

* * * * *